United States Patent
Andersson et al.

(10) Patent No.: US 9,923,593 B2
(45) Date of Patent: *Mar. 20, 2018

(54) TRANSMITTER RECEIVER LEAKAGE REDUCTION IN A FULL DUPLEX SYSTEM WITHOUT THE USE OF A DUPLEXER

(71) Applicant: Telefonaktiebolaget L M Ericsson (publ), Stockholm (SE)

(72) Inventors: Stefan Andersson, Lund (SE); Imad ud Din, Lund (SE); Daniel Eckerbert, Landskrona (SE); Henrik Sjöland, Lund (SE); Johan Wernehag, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/774,296

(22) PCT Filed: Mar. 14, 2013

(86) PCT No.: PCT/EP2013/055303
§ 371 (c)(1),
(2) Date: Sep. 10, 2015

(87) PCT Pub. No.: WO2014/139579
PCT Pub. Date: Sep. 18, 2014

(65) Prior Publication Data
US 2016/0043767 A1 Feb. 11, 2016

(51) Int. Cl.
*H04L 5/14* (2006.01)
*H04B 1/44* (2006.01)
(Continued)

(52) U.S. Cl.
CPC ............... *H04B 1/44* (2013.01); *H04B 1/123* (2013.01); *H04B 1/525* (2013.01); *H04L 5/14* (2013.01)

(58) Field of Classification Search
CPC .......... H04B 1/44; H04B 1/123; H04B 1/525; H04L 5/14
(Continued)

(56) References Cited

U.S. PATENT DOCUMENTS 404,375 A 6/1869 Bain
3,900,823 A 8/1975 Sokal et al.
(Continued)

FOREIGN PATENT DOCUMENTS

CN 102332931 A 1/2012
EP 0388927 A1 9/1990
(Continued)

OTHER PUBLICATIONS

Mikhemar, M. et al. "An On-Chip Wideband and Low-Loss Duplexer for 3G/4G CMOS Radios." 2010 Symposium on VLSI Circuits/Technical Digest of Technical Papers, Jun. 16-18, 2010, pp. 129-130.
(Continued)

*Primary Examiner* — Chuong T Ho
(74) *Attorney, Agent, or Firm* — Coats & Bennett, PLLC

(57) ABSTRACT

A transceiver suitable for frequency duplex division communication is disclosed. The transceiver comprises a transmitter, wherein the transmitter comprises a power amplifier; a receiver; an auxiliary power amplifier which is arranged to provide a controllable phase shift and gain output; a first filter arranged at an output of the power amplifier arranged to attenuate frequencies at a receiving frequency of the receiver; a second filter arrangement at an output of the auxiliary power amplifier arranged to attenuate frequencies
(Continued)

at a receiving frequency of the receiver; and a signal transmission arrangement. The signal transmission arrangement is arranged to transmit signals provided from the transmitter through its power amplifier to a radio frequency, RF, connecting point, receive signals from the RF connecting point and provide the signals to the receiver, and provide signals from the auxiliary amplifier towards an input of the receiver. The transceiver also comprises a controller, wherein the controller is arranged to control the auxiliary power amplifier output to provide a signal that has a phase and amplitude in relation to the output of the power amplifier of the transmitter such that the transmitter contribution to the signal at the input of the receiver is suppressed. A method of controlling the transceiver, a communication device and computer program are also disclosed.

33 Claims, 8 Drawing Sheets

(51) Int. Cl.
*H04B 1/525* (2015.01)
*H04B 1/12* (2006.01)

(58) Field of Classification Search
USPC .................................................. 370/272–293
See application file for complete search history.

(56) References Cited

U.S. PATENT DOCUMENTS

| | | | |
|---|---|---|---|
| 4,325,140 A | 4/1982 | Stitzer | |
| 5,404,375 A | 4/1995 | Kroeger et al. | |
| 6,169,912 B1 | 1/2001 | Zuckerman | |
| 6,567,648 B1 | 5/2003 | Ahn et al. | |
| 6,567,649 B2 | 5/2003 | Souissi | |
| 6,745,018 B1 | 6/2004 | Zehavi et al. | |
| 7,109,793 B2 | 9/2006 | Nakatani et al. | |
| 7,756,480 B2 | 7/2010 | Loh | |
| 8,654,743 B1 | 2/2014 | Li et al. | |
| 8,797,927 B2* | 8/2014 | Chen | H04B 1/44 |
| | | | 370/297 |
| 8,909,161 B2 | 12/2014 | Din et al. | |
| 9,143,186 B2 | 9/2015 | Andersson et al. | |
| 9,344,139 B2* | 5/2016 | Sjoland | H04B 1/40 |
| 2003/0008693 A1 | 1/2003 | Tanaka et al. | |
| 2003/0128081 A1 | 7/2003 | Ella et al. | |
| 2003/0193997 A1 | 10/2003 | Dent et al. | |
| 2004/0180633 A1 | 9/2004 | Nakatani et al. | |
| 2005/0035824 A1 | 2/2005 | Kearns | |
| 2005/0046585 A1 | 3/2005 | Dodge | |
| 2005/0170790 A1 | 8/2005 | Chang et al. | |
| 2006/0028298 A1 | 2/2006 | Nakamura et al. | |
| 2006/0133599 A1 | 6/2006 | Pagnanelli | |
| 2006/0135084 A1 | 6/2006 | Lee | |
| 2006/0261902 A1 | 11/2006 | Masuda et al. | |
| 2007/0015468 A1 | 1/2007 | Kouki et al. | |
| 2007/0117524 A1 | 5/2007 | Do | |
| 2007/0152904 A1 | 7/2007 | Castaneda et al. | |
| 2007/0182509 A1 | 8/2007 | Park et al. | |
| 2007/0202826 A1 | 8/2007 | Dean | |
| 2007/0207747 A1 | 9/2007 | Johnson et al. | |
| 2007/0217488 A1 | 9/2007 | Smaini et al. | |
| 2008/0198773 A1 | 8/2008 | Loh | |
| 2008/0238789 A1 | 10/2008 | Wilcox | |
| 2008/0242235 A1 | 10/2008 | Adler et al. | |
| 2008/0279262 A1 | 11/2008 | Shanjani | |
| 2009/0028074 A1 | 1/2009 | Knox | |
| 2009/0253385 A1* | 10/2009 | Dent | H04B 1/0458 |
| | | | 455/83 |
| 2009/0289739 A1 | 11/2009 | Sasaki et al. | |
| 2010/0035563 A1 | 2/2010 | Mikhemar et al. | |
| 2010/0109800 A1 | 5/2010 | Ueda et al. | |
| 2010/0148886 A1 | 6/2010 | Inoue et al. | |
| 2010/0159837 A1 | 6/2010 | Dent et al. | |
| 2010/0253477 A1 | 10/2010 | Seppä et al. | |
| 2010/0279617 A1 | 11/2010 | Osman | |
| 2010/0304701 A1 | 12/2010 | Jung et al. | |
| 2011/0064004 A1 | 3/2011 | Mikhemar et al. | |
| 2011/0064005 A1 | 3/2011 | Mikhemar et al. | |
| 2011/0124309 A1 | 5/2011 | Trotta et al. | |
| 2011/0158134 A1 | 6/2011 | Mikhemar et al. | |
| 2011/0175789 A1 | 7/2011 | Lee et al. | |
| 2011/0187478 A1 | 8/2011 | Link et al. | |
| 2011/0199142 A1 | 8/2011 | Mu | |
| 2011/0221521 A1 | 9/2011 | Razzell et al. | |
| 2011/0299433 A1 | 12/2011 | Darabi et al. | |
| 2011/0299437 A1 | 12/2011 | Mikhemar et al. | |
| 2012/0009886 A1 | 1/2012 | Poulin | |
| 2012/0126907 A1 | 5/2012 | Nakamoto et al. | |
| 2012/0195351 A1 | 8/2012 | Banwell et al. | |
| 2013/0063223 A1 | 3/2013 | See et al. | |
| 2013/0077540 A1 | 3/2013 | Black et al. | |
| 2013/0176912 A1 | 7/2013 | Khlat | |
| 2013/0194978 A1 | 8/2013 | Andersson et al. | |
| 2013/0258911 A1 | 10/2013 | Choksi | |
| 2013/0271004 A1 | 10/2013 | Min et al. | |
| 2013/0315116 A1* | 11/2013 | Chen | H04B 1/44 |
| | | | 370/297 |
| 2014/0169231 A1 | 6/2014 | Mikhemar et al. | |
| 2014/0169235 A1 | 6/2014 | Mikhemar et al. | |
| 2014/0253236 A1 | 9/2014 | Cheeranthodi et al. | |
| 2014/0315501 A1 | 10/2014 | Rudell et al. | |
| 2014/0364073 A1* | 12/2014 | Sjoland | H04B 1/525 |
| | | | 455/90.2 |
| 2014/0376419 A1 | 12/2014 | Goel et al. | |
| 2015/0156005 A1 | 6/2015 | Sjoland et al. | |
| 2015/0281974 A1 | 10/2015 | Ghasemzadeh et al. | |
| 2015/0303981 A1 | 10/2015 | Sjoland et al. | |
| 2016/0065352 A1 | 3/2016 | Sjoland et al. | |
| 2016/0072542 A1 | 3/2016 | Sjoland et al. | |
| 2016/0294436 A1 | 10/2016 | Din et al. | |

FOREIGN PATENT DOCUMENTS

| | | |
|---|---|---|
| EP | 1813030 A1 | 8/2007 |
| EP | 2226948 A1 | 9/2010 |
| EP | 2296286 A2 | 3/2011 |
| EP | 2388927 A2 | 11/2011 |
| EP | 2672631 A1 | 12/2013 |
| RU | 2264032 C2 | 11/2005 |
| WO | 2006068635 A1 | 6/2006 |
| WO | 2007149954 A1 | 12/2007 |
| WO | 2009080878 A1 | 7/2009 |
| WO | 2011146404 A1 | 11/2011 |
| WO | 2014173459 A1 | 10/2014 |
| WO | 2014177191 A1 | 11/2014 |

OTHER PUBLICATIONS

Mikhemar, M. et al. "A Tunable Integrated Duplexer with 50dB Isolation in 40nm CMOS." 2009 IEEE International Solid-State Circuits Conference, ISSCC 2009 / Session 22/ PA and Antenna Interface / 22.7, Feb. 11, 2009, 3 pages.
Pursula, P. et al. "Hybrid Transformer-Based Adaptive RF Front End for UHF RFID Mobile Phone Readers." 2008 IEEE International Conference on RFID, The Venetian, Las Vegas, Nevada, USA, Apr. 16-17, 2008, pp. 150-155.
Larson, L. et al. "4th Generation Wireless Transceiver Design." 2010 IEEE Bipolar/BiCMOS Circuits and Technology Meeting (BCTM), Oct. 4-6, 2010, pp. 113-120.
Elzayat, A. "Tx/Rx Isolation Enhancement Based on a Novel Balanced Duplexer Architecture." 2011 IEEE MTT-S International Microwave Symposium Digest (MTT), Jun. 5-10, 2011, pp. 1-4.

* cited by examiner

US 9,923,593 B2

1

TRANSMITTER RECEIVER LEAKAGE REDUCTION IN A FULL DUPLEX SYSTEM WITHOUT THE USE OF A DUPLEXER

TECHNICAL FIELD

The present invention generally relates to a transceiver, a method of operating the transceiver, and a computer program for implementing the method. The present invention also relates to a communication device capable of frequency division duplex communication comprising such a transceiver.

BACKGROUND

Transceivers comprise both a transmitter and a receiver, and are commonly used in a variety of communication apparatuses. Transceivers can be arranged to be operated in semi-duplex, i.e. the receiver and transmitter operates on same frequency but separated in time to prevent the transmitter signal from concealing the received signal. This approach is therefore commonly referred to as time division duplex (TDD). Transceivers can also be operated in full duplex, i.e. the receiver and transmitter operates simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD may interfere with the received signal. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) energy from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and unable to be implemented on-chip. Therefore, efforts have been made in the art to achieve the similar effects with on-chip solutions. These are based on electrical balance by using a dummy load which is arranged to be equal to the antenna impedance. Thus, a first portion of energy is directed towards the antenna for transmission, and a second portion of the energy is directed towards the dummy load where it is dissipated as heat. If the dummy load is configured to have an impedance equal to that of the antenna, the first and second portions are equal, and, when using a differential input to the receiver, the contribution at receiver input from the transmitted signal can be suppressed. An example of such approach is disclosed in US 2011/

2

0064004 A1. However, here it can be seen that half of the transmission energy is lost in heat dissipation in the dummy load.

It is therefore a desire to provide an approach for transceivers where the above discussed drawbacks are reduced.

SUMMARY

An object of the invention is to at least alleviate the above stated problem. The present invention is based on the understanding that by providing a counter-contribution to the contribution of a power amplifier of a transmitter at the input of a receiver in a transceiver arrangement, the contribution can be suppressed. An auxiliary power amplifier provides the transmit signal with a certain amplitude and phase shift for providing this counter-contribution. The counter-contribution can be applied in different ways, as will be demonstrated below. To further decrease impact by the output of the power amplifier at receiving frequencies at the input of the receiver, and also such impact by the auxiliary power amplifier, filtering of the outputs of the power amplifier and the auxiliary power amplifier is provided, thereby reducing transmitter noise at the input of the receiver.

According to a first aspect, there is provided a transceiver suitable to frequency duplex division communication. The transceiver comprises a transmitter, wherein the transmitter comprises a power amplifier; a receiver; an auxiliary power amplifier which is arranged to provide a controllable phase shift and gain output; a first filter arranged at an output of the power amplifier arranged to attenuate frequencies at a receiving frequency of the receiver; a second filter arrangement at an output of the auxiliary power amplifier arranged to attenuate frequencies at a receiving frequency of the receiver; and a signal transmission arrangement. The signal transmission arrangement is arranged to transmit signals provided from the transmitter through its power amplifier to a radio frequency, RF, connecting point, receive signals from the RF connecting point and provide the signals to the receiver, and provide signals from the auxiliary amplifier towards an input of the receiver. The transceiver also comprises a controller, wherein the controller is arranged to control the auxiliary power amplifier output to provide a signal that has a phase and amplitude in relation to the output of the power amplifier of the transmitter such that the transmitter contribution to the signal at the input of the receiver is suppressed.

The receiving frequency of the receiver may be lower than a transmitting frequency of the transmitter, wherein the first filter may be a high-pass filter or a band-pass filter, and the second filter may be a high-pass filter or a band-pass filter. The band-pass filters of the first and second filters may each comprise a first capacitance and an inductance coupled in parallel where the parallel coupling is coupled in series with a second inductance. According to one option, at least one of the capacitance and the first and second inductances of each of the first and second filters may be controllable and may then be controlled by the controller.

The receiving frequency of the receiver may be higher than a transmitting frequency of the transmitter, wherein the first filter may be a low-pass filter or a band-pass filter, and the second filter may be a low-pass filter or a band-pass filter. The band-pass filters of the first and second filters may each comprise a capacitance and a first inductance coupled in parallel, where the parallel coupling is coupled in series with a second capacitance. According to one option, at least one of the inductance and the first and second capacitances of each of the first and second filters may be controllable and may then be controlled by the controller.

The controller may be arranged to control an input to the auxiliary power amplifier such that the auxiliary power amplifier is enabled to provide the controllable phase shift and gain output. The control of the input to the auxiliary power amplifier may be a control of a baseband circuit connected to the transceiver.

The controller may be arranged to control the auxiliary power amplifier such that the auxiliary power amplifier is enabled to provide the controllable phase shift and gain output.

The signal transmission arrangement may comprise a first impedance element connected between an output of the auxiliary power amplifier filter and an input of the receiver; and a second impedance element connected between an output of the power amplifier filter of the transmitter and the input of the receiver wherein the second impedance element also is connected between the RF connecting point and the input of the receiver. The first impedance element may have controllable impedance, the second impedance element may have controllable impedance, and the controller may be arranged to control also impedances of the first impedance element and the second impedance element. The output of the auxiliary power amplifier may be controlled to have a relation in phase to the output of the power amplifier of the transmitter and to have an amplitude having a relation to the output of the power amplifier of the transmitter, and the first and second impedance elements may be controlled to have a corresponding relation of their impedances. The output of the auxiliary power amplifier may be controlled to have opposite phase to the output of the power amplifier of the transmitter and to have equal amplitude to the output of the power amplifier of the transmitter, and the first and second impedance elements have equal impedances.

The second impedance element may comprise a first and a second impedance connected in series, and the controller may be arranged to provide its control by a feedback structure and measure at a point between the first and second impedances of the second impedance element and the output of the auxiliary power amplifier wherein feedback is based on the measurements.

The transceiver may further comprise a parallel resonance tank circuit including the first and second impedance elements and a third impedance element connected between the output of the auxiliary power amplifier filter and the power amplifier filter of the transmitter, wherein the parallel resonance tank is tuned to a frequency of a signal component received by the signal transmission arrangement that is desired to be suppressed.

The receiver may further comprise a receiver impedance element at the input of the receiver, the receiver impedance element may have controllable impedance, and the controller may be arranged to control the receiver impedance element such that the second impedance element and the receiver impedance element together have a resonance frequency equal to a frequency of a signal desired to be received by the receiver.

The first and second impedance elements may comprise inductors. The first and second impedance elements may comprise capacitors.

The signal transmission arrangement may comprise a connection coupling the output signal from the first filter to the RF connecting point; a primary winding coupling a signal from the RF connecting point to the receiver via a capacitance; and a secondary winding interacting with the primary winding and coupled to the output of the second filter of the auxiliary power amplifier such that the provision of the signals from the auxiliary power amplifier is enabled.

The signal transmission arrangement may comprise a primary winding connected to the RF connecting point and a secondary winding interacting with the primary winding, wherein the secondary winding is coupling a signal from the RF connecting point to the receiver, and wherein the primary winding is coupled to the output of the second filter of the auxiliary power amplifier such that the provision of the signals from the auxiliary power amplifier is enabled, and to a third filter connected to a reference voltage such that current swing at the receiving frequency is enabled in the primary winding.

The signal transmission arrangement may comprise a primary winding connected to the RF connecting point and a secondary winding interacting with the primary winding, wherein the secondary winding is coupling a signal from the RF connecting point to the receiver, and wherein the primary winding is coupled to a third filter connected to a reference voltage such that current swing at the receiving frequency is enabled in the primary winding, the third filter comprising a further primary winding, wherein a further secondary winding interacting with the further primary winding which is coupled to the output of the second filter of the auxiliary power amplifier such that the provision of the signals from the auxiliary power amplifier is enabled.

The signal transmission arrangement may comprise a first primary winding connected to the RF connecting point, a second primary winding, and secondary winding interacting with the first and secondary primary windings, wherein the secondary winding is coupling a signal from the RF connecting point to the receiver, and wherein the first primary winding is coupled to a third filter connected to a reference voltage such that current swing at the receiving frequency is enabled in the first primary winding, and the second primary winding is coupled to the output of the second filter of the auxiliary power amplifier such that the provision of the signals from the auxiliary power amplifier is enabled.

The signal transmission arrangement may comprise a connection coupling the output signal from the first filter to the RF connecting point; and a third filter coupling a signal from the RF connecting point to the receiver, wherein the output of the second filter is connected directly to the input of the receiver.

The receiving frequency of the receiver may be lower than a transmitting frequency of the transmitter, and the third filter may then be a low-pass filter or a band-pass filter. The band-pass filter of third filter may comprise a capacitance and a first inductance coupled in parallel, where the parallel coupling is coupled in series with a second capacitance. According to one option, at least one of the inductance and the first and second capacitances of the third filter may be controllable and may then be controlled by the controller.

The receiving frequency of the receiver may be higher than a transmitting frequency of the transmitter, and the third filter may then be a high-pass filter or a band-pass filter. The band-pass filter of third filter may comprise a first capacitance and an inductance coupled in parallel, with the parallel coupling coupled in series with a second inductance. According to one option, at least one of the capacitance and the first and second inductances of the third filter may be controllable and may then be controlled by the controller.

The controller may be arranged to provide its control by a feedback structure and measure the output of the power amplifier of the transmitter and the output of the auxiliary power amplifier wherein feedback is based on the measurements.

The controller may be arranged to provide its control by a feedback structure and measure the transmitter contribution at the input of the receiver wherein feedback is based on the measurement.

According to a second aspect, there is provided a communication device, capable of frequency division duplex communication in a communication network, comprising a transceiver according to the first aspect.

According to a third aspect, there is provided a method for controlling a transceiver. The transceiver comprises a transmitter comprising a power amplifier, a receiver, an auxiliary power amplifier which has controllable phase shift and gain output, a first filter arranged at an output of the power amplifier arranged to attenuate frequencies at a receiving frequency of the receiver, a second filter arrangement at an output of the auxiliary power amplifier arranged to attenuate frequencies at a receiving frequency of the receiver, a signal transmission arrangement arranged to transmit signals provided from the transmitter through its power amplifier to a radio frequency, RF, connecting point, receive signals from the RF connecting point and provide the signals to the receiver, and provide signals from the auxiliary amplifier towards an input of the receiver. The method comprises controlling an output of the auxiliary power amplifier to provide a signal that has a phase and amplitude in relation to the output of the power amplifier of the transmitter such that the transmitter contribution to the signal at the input of the receiver is suppressed.

Where the signal transmission arrangement comprises a first impedance element connected between an output of the auxiliary power amplifier filter and an input of the receiver, and a second impedance element connected between an output of the power amplifier filter of the transmitter and the input of the receiver wherein the second impedance element also is connected between the RF connecting point and the input of the receiver, wherein the first impedance element has controllable impedance and the second impedance element has controllable impedance, the method may further comprise controlling the impedances of the first and second impedance elements.

The controlling may further comprise controlling the output at the auxiliary power amplifier to have a relation in phase to the output of the power amplifier of the transmitter and to have an amplitude having a relation to the output of the power amplifier of the transmitter, and the first and second impedance elements to have a corresponding relation of their impedances.

The controlling further comprise controlling the output at the auxiliary power amplifier to have opposite phase to the output of the power amplifier of the transmitter and to have equal amplitude to the output of the power amplifier of the transmitter, and the first and second impedance elements have equal impedances.

Where the signal transmission arrangement comprises a connection coupling the output signal from the first filter to the RF connecting point, a primary winding coupling a signal from the RF connecting point to the receiver via a controllable capacitance such that received signals are provided to the receiver, and a secondary winding interacting with the primary winding and coupled to the output of the second filter of the auxiliary power amplifier such that the provision of the signals from the auxiliary power amplifier is enabled, the method may further comprise controlling the controllable capacitance.

Where the signal transmission arrangement comprises a primary winding connected to the RF connecting point and a secondary winding interacting with the primary winding, wherein the secondary winding is coupling a signal from the RF connecting point to the receiver, and wherein the primary winding is coupled to the output of the second filter of the auxiliary power amplifier such that the provision of the signals from the auxiliary power amplifier is enabled, and to a third filter connected to a reference voltage such that current swing at the receiving frequency is enabled in the primary winding, the method may further comprise controlling the third filter.

Where the signal transmission arrangement comprises a primary winding connected to the RF connecting point and a secondary winding interacting with the primary winding, wherein the secondary winding is coupling a signal from the RF connecting point to the receiver, and wherein the primary winding is coupled to a third filter connected to a reference voltage such that current swing at the receiving frequency is enabled in the primary winding, the third filter comprising a further primary winding, wherein a further secondary winding interacting with the further primary winding which is coupled to the output of the second filter of the auxiliary power amplifier such that the provision of the signals from the auxiliary power amplifier is enabled, the method may further comprise controlling the third filter.

Where the signal transmission arrangement comprises a first primary winding connected to the RF connecting point, a second primary winding, and secondary winding interacting with the first and secondary primary windings, wherein the secondary winding is coupling a signal from the RF connecting point to the receiver, and wherein the first primary winding is coupled to a third filter connected to a reference voltage such that current swing at the receiving frequency is enabled in the first primary winding, and the second primary winding is coupled to the output of the second filter of the auxiliary power amplifier such that the provision of the signals from the auxiliary power amplifier is enabled, the method may further comprise controlling the third filter.

Where the signal transmission arrangement comprises a connection coupling the output signal from the first filter to the RF connecting point, and a third filter coupling a signal from the RF connecting point to the receiver, wherein the output of the second filter is connected directly to the input of the receiver, the method may further comprise controlling the third filter. The receiving frequency of the receiver may be lower than a transmitting frequency of the transmitter, and the third filter may be a band-pass filter, wherein the band-pass filter of third filter comprises a capacitance and a first inductance coupled in parallel, where the parallel coupling is coupled in series with a second capacitance and at least one of the inductance and the first and second capacitances of the third filter is controllable, wherein the controlling of the third filter may comprise controlling at least one of the inductance and the first and second capacitances of the third filter. The receiving frequency of the receiver may be higher than a transmitting frequency of the transmitter, and the third filter is a band-pass filter, wherein the band-pass filter of third filter may comprise a first capacitance and an inductance coupled in parallel, with the parallel coupling coupled in series with a second inductance, wherein at least one of the capacitance and the first and second inductances of the third filter is controllable, wherein the controlling of the third filter may comprise controlling at least one of the capacitance and the first and second inductances of the third filter.

The controlling may be feedback controlling by measuring the output of the power amplifier of the transmitter and the output of the auxiliary power amplifier wherein the feedback controlling is based on the measurements.

The controlling may be feedback controlling by measuring the transmitter contribution at the input of the receiver wherein the feedback controlling is based on the measurement.

The receiver may further comprise a receiver impedance element at the input of the receiver, the receiver impedance element has controllable impedance, wherein the method further may comprise controlling the impedance of the receiver impedance element such that a path from the RF connecting point towards the receiver of the signal transmission arrangement and the receiver impedance element together have a resonance frequency equal to a frequency of a signal desired to be received by the receiver.

The controlling of the output of the auxiliary power amplifier may comprise controlling an input signal to the auxiliary power amplifier. The controlling of the input signal to the auxiliary power amplifier may comprise controlling a baseband circuit connected to the transceiver.

The controlling of the output of the auxiliary power amplifier may comprise controlling the auxiliary power amplifier such that the auxiliary power amplifier is enabled to provide the controllable phase shift and gain output.

According to a fourth aspect, there is provided a computer program comprising computer executable instructions which when executed by a programmable controller of a transceiver causes the controller to perform the method according to the third aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
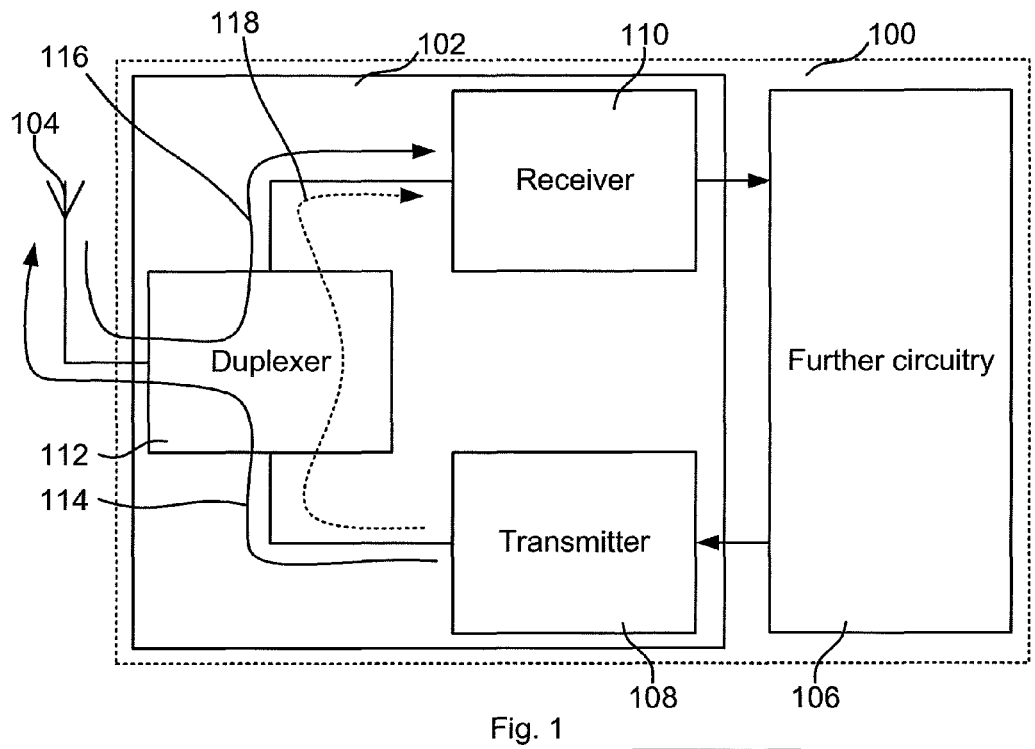
FIG. 1 is a block diagram which schematically illustrates a conventional communication apparatus comprising a transceiver.
Figure 2:
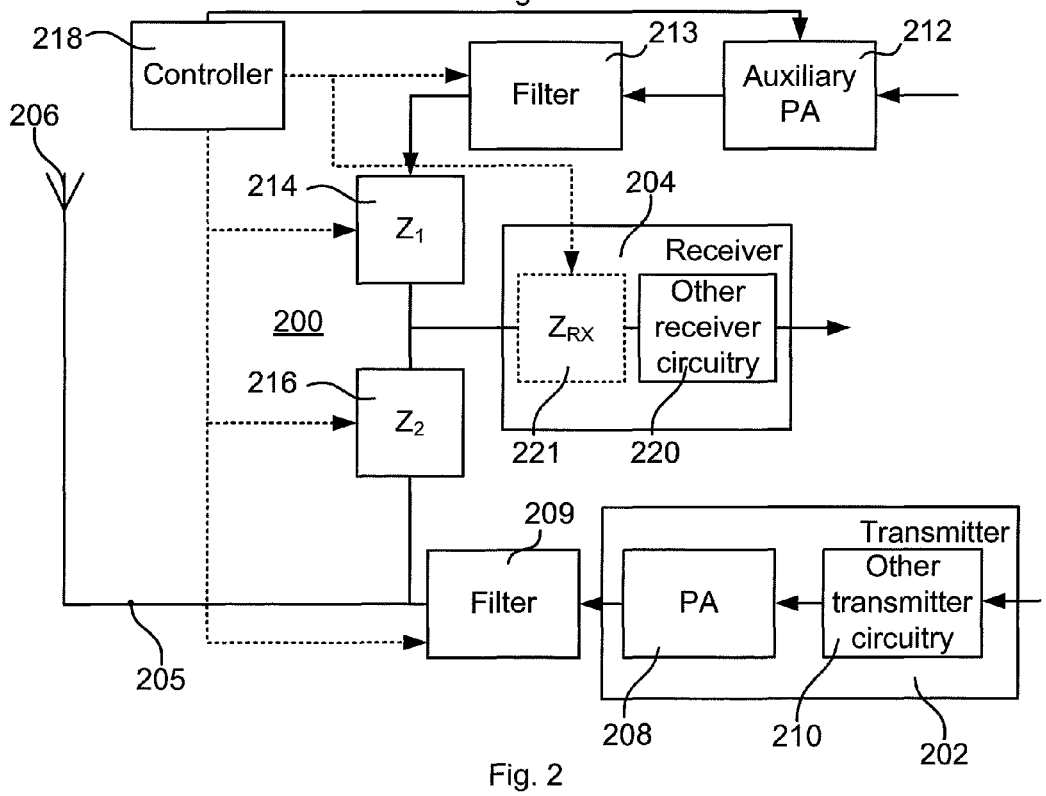
FIG. 2 is a block diagram which schematically illustrates transceiver according to an embodiment.

FIG. 2 is a block diagram which schematically illustrates a transceiver 200 according to an embodiment. The transceiver 200 comprises a transmitter 202, a receiver 204, and a signal transmission arrangement 206, such as the depicted antenna arrangement, or a wired connection. The transmitter 202 comprises a power amplifier (PA) 208, and can also comprise further transmitter circuitry 210, which further transmitter circuitry however is not further discussed in this disclosure since it does not have impact of the inventive contribution to the art. The antenna arrangement 206 is arranged to transmit radio frequency signals provided from the transmitter 202 through its power amplifier 208, and is also arranged to receive radio frequency signals and provide them to the receiver 204. The transceiver 200 further comprises an auxiliary power amplifier 212 which has controllable phase shift and gain. The function of the auxiliary PA 212 will be discussed below. The transceiver 200 also comprises a first impedance element 214 and a second impedance element 216 which have controllable impedances. The function of the first and second impedance elements 214, 216 will be discussed below. The auxiliary PA 212 has its input connected to either the input of the PA 208 of the transmitter 202 or connected to be provided with an adjusted input as will be further elucidated below, and its output connected to a filter 213 which is arranged to let through frequencies at which the transceiver 200 is transmitting while attenuating at frequencies at which the transceiver 200 is receiving. Thereby, noise that may be caused by the auxiliary PA at the receiving frequencies will be attenuated before reaching the input of the receiver. The output of the filter 213 is connected to the first impedance element 214, which is connected between the output filter 213 of the auxiliary PA and an input of the receiver 204. The second impedance element 216 is connected between an output of a corresponding filter 209 of the PA 208 of the transmitter 202 and the input of the receiver 204, i.e. the first and second impedance elements 214, 216 are connected in series between the output of the filter 213 of the auxiliary PA 212 and the output of the filter 209 of the PA 208 of the transmitter 202 as a voltage divider there between, wherein the divided voltage is provided to the input of the receiver 204. This structure will be used for the function demonstrated below for this embodiment. The transceiver 200 also comprises a controller 218 which is arranged to control the auxiliary PA 212, and optionally also to control the first impedance element 214 and the second impedance element 216.

Figure 15:
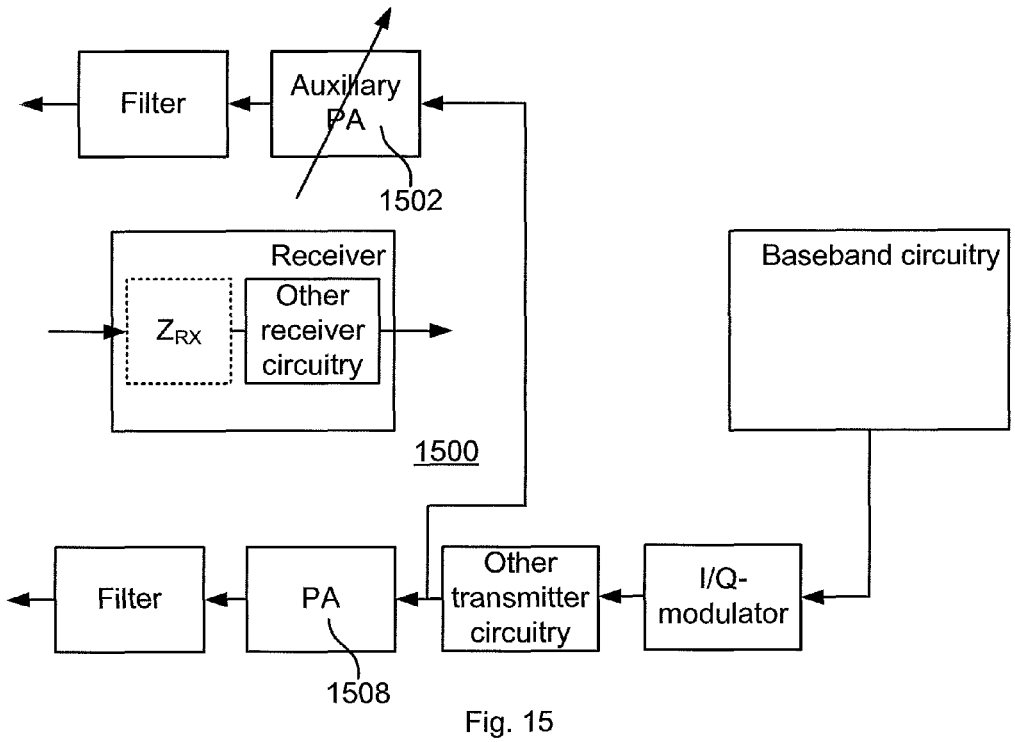
FIG. 15 is a block diagram schematically illustrating a transceiver according to an embodiment.
Figure 16:
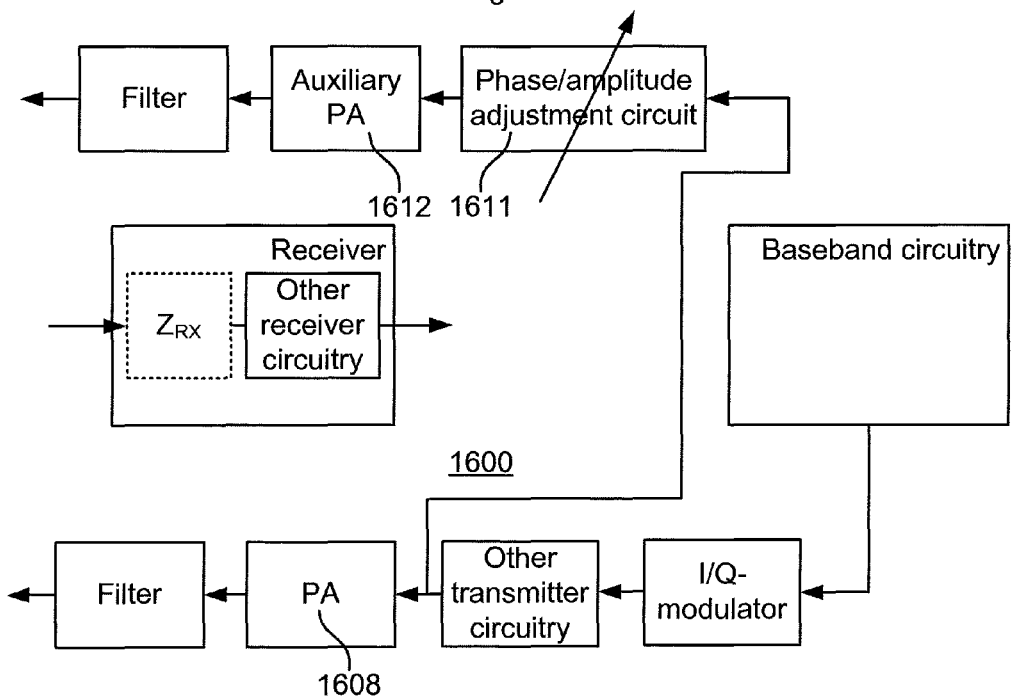
FIG. 16 is a block diagram schematically illustrating a transceiver according to an embodiment.
Figure 17:
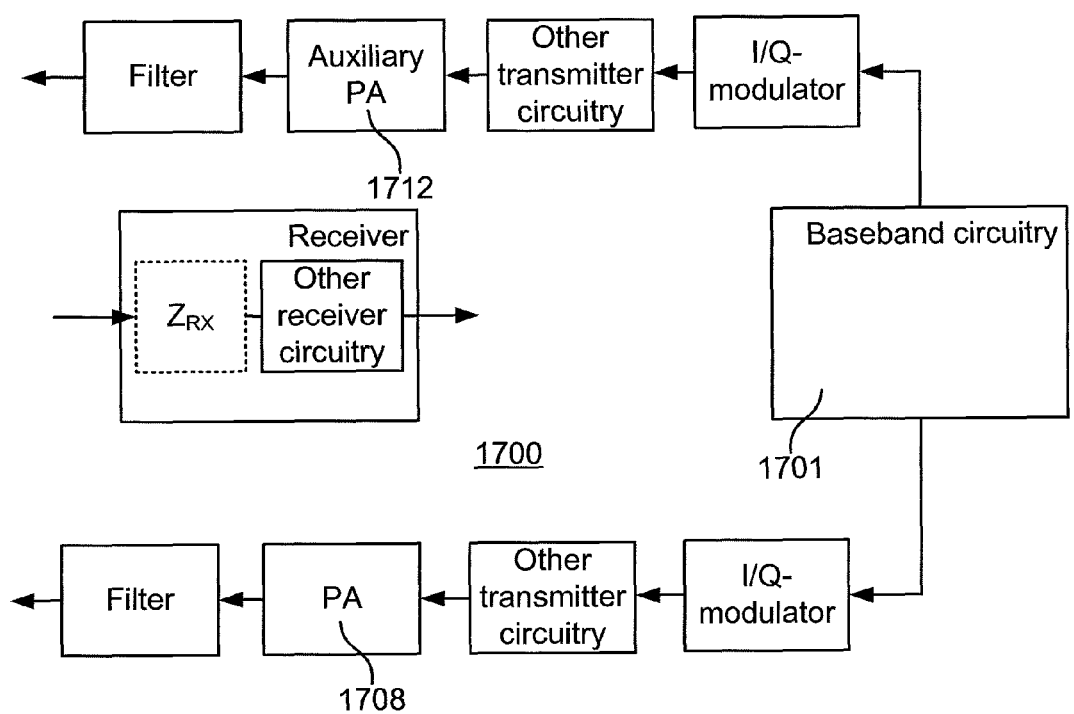
FIG. 17 is a block diagram schematically illustrating a transceiver according to an embodiment.

The output of the auxiliary PA 212, i.e. phase and amplitude, can be controlled by controlling the auxiliary PA 212 itself, as indicated in FIG. 15, wherein the auxiliary PA 212 can have the same signals as input as the PA 208. Alternatively, the input to the auxiliary PA 212 is adjusted either by a separate adjustment element, as indicated in FIG. 16, adjusting the input to the auxiliary PA 212 such that the output of the auxiliary PA 212 gets the properties as elucidated below, or by a baseband circuit, as indicated in FIG. 17, connected to the transceiver 200. The baseband circuit then provides an adjusted input to the auxiliary PA 212. In the latter example, the baseband circuit can for example be a digital baseband circuit where the adjusted input to the auxiliary PA 212 is adjusted in digital domain.

By controlling the output of the auxiliary PA 212 to have a phase and amplitude, which when voltage division by the controlled first and second impedance elements 214, 216 between the voltages of the output of the auxiliary PA 212 and the output of the PA 208 of the transmitter 202, the divided voltage can be such that the transmitter contribution to the signal at the input of the receiver is reduced. One example is that the auxiliary PA 212 outputs the same voltage as the PA 208, but with opposite phase, and the first and second impedance elements are controlled to have mutually equal impedances. Here, "opposite phase" should be construed in its technical context where exactly a 180 degree phase shift may not be the optimised value, as for one example where the best suppression was found to be reached somewhere between 172 and 173 degrees in that particular case. Due to imperfections, the optimised value may not be reached, at least not at all times, in a real-world implementation, and the ideal situation with total cancelling is in practical implementations not reachable. In an ideal (but fictive) situation, the contribution from the transmitter at the receiver input would however be zero. The ratio between the output of the auxiliary PA 212 and the output of the PA, and corresponding ratio between the first and second impedance elements 214, 216 can be chosen in different ways. Here it should be noted that the second impedance element 216 will also be a part of the reception path from the antenna arrangement 206 to the receiver 204. Thus, the control mechanism can set a restriction for the second impedance element 216 based on receiver properties, and the control is then made on the auxiliary PA 212 and the first impedance element 214 to achieve the reduction of transmitter contribution to the receiver input. The structure provides for a multitude of control strategies, and a selection thereof will be demonstrated below.

Thus, the controller 218 can be arranged to control both the output of the auxiliary PA 212, to provide a signal that has a phase and amplitude in relation to the output of the PA 208 of the transmitter 202, and the first and second impedance elements 214, 216 such that the transmitter contribution to the signal at the input of the receiver is reduced. The reader may at this point ask why the parameters are not set to the right values, and the transceiver will work properly. However, the impedance of the signal transmission arrangement can change substantially during operation, for example due to the changing environment of an antenna in a handheld device when held in different ways, and due to operation in different frequency bands. But upon considering a particular use case for a transceiver where such phenomena are not present, the controller 212 can be omitted, and the structure demonstrated above can be used with fixed parameters. Thus, the controller is not essential for the operation in all situations, or can be considered to be a fixed parameter setting for the particular transceiver implementation.

The receiver 204 can optionally further comprise, in addition to other receiver circuitry 220, which further receiver circuitry however is not further discussed in this disclosure since it does not have impact of the inventive contribution to the art, a receiver impedance element 221 at the input of the receiver 204. The receiver impedance element 221 has controllable impedance, and the controller 218 is arranged to control the receiver impedance element such that the second impedance element 216 and the receiver impedance element 221 together have a resonance frequency equal to a frequency of a signal desired to be received by the receiver 204. This provides for a further degree of freedom in controlling the transceiver.

The output filters 209, 213 of the PA and auxiliary PA are arranged to pass frequencies at which transmitting is performed and attenuating frequencies at which receiving is performed by the transceiver 200. This is suitable when frequency division duplex (FDD) is employed, i.e. where transmit and receive frequencies are structurally separated. The filtering can be arranged in different ways, such as for example notching at frequencies of receiving by the transceiver 200. The transceiver 200 when operating in a communication system employing FDD can however, due to allocation of receive and transmit frequencies in the particular system, use low-pass or high-pass filters since it then is given that the receive frequency is higher or lower than the transmit frequency. This implies that filter design can be easier and/or more efficient filters can be used. For example, if it is known that the receive frequency is always lower, e.g. by a certain distance in frequency, than the transmit frequency, then high-pass filters can be used for the output filters 209, 213 of the PA 208 and the auxiliary PA 212. For the opposite case, i.e. receive frequency is always higher than transmit frequency, low-pass filters can be used. The filters can be controlled, i.e. their frequency properties such as cut-off frequency, such that change of operation frequency of the transceiver 200 can be handled. The implementation of the high-pass and low-pass filters can be made quite simple but may then not provide high enough attenuation at receive frequencies and/or cause too much loss in transmit frequencies, particularly when receive and transmit frequencies are fairly close in frequency. It has been found beneficiary to use a band-pass filter, for example as demonstrated with reference to FIGS. 10 and 11 below, to achieve good attenuation at receive frequencies and low loss at transmit frequencies. This is particularly beneficiary in the situation demonstrated above.

Figure 3:
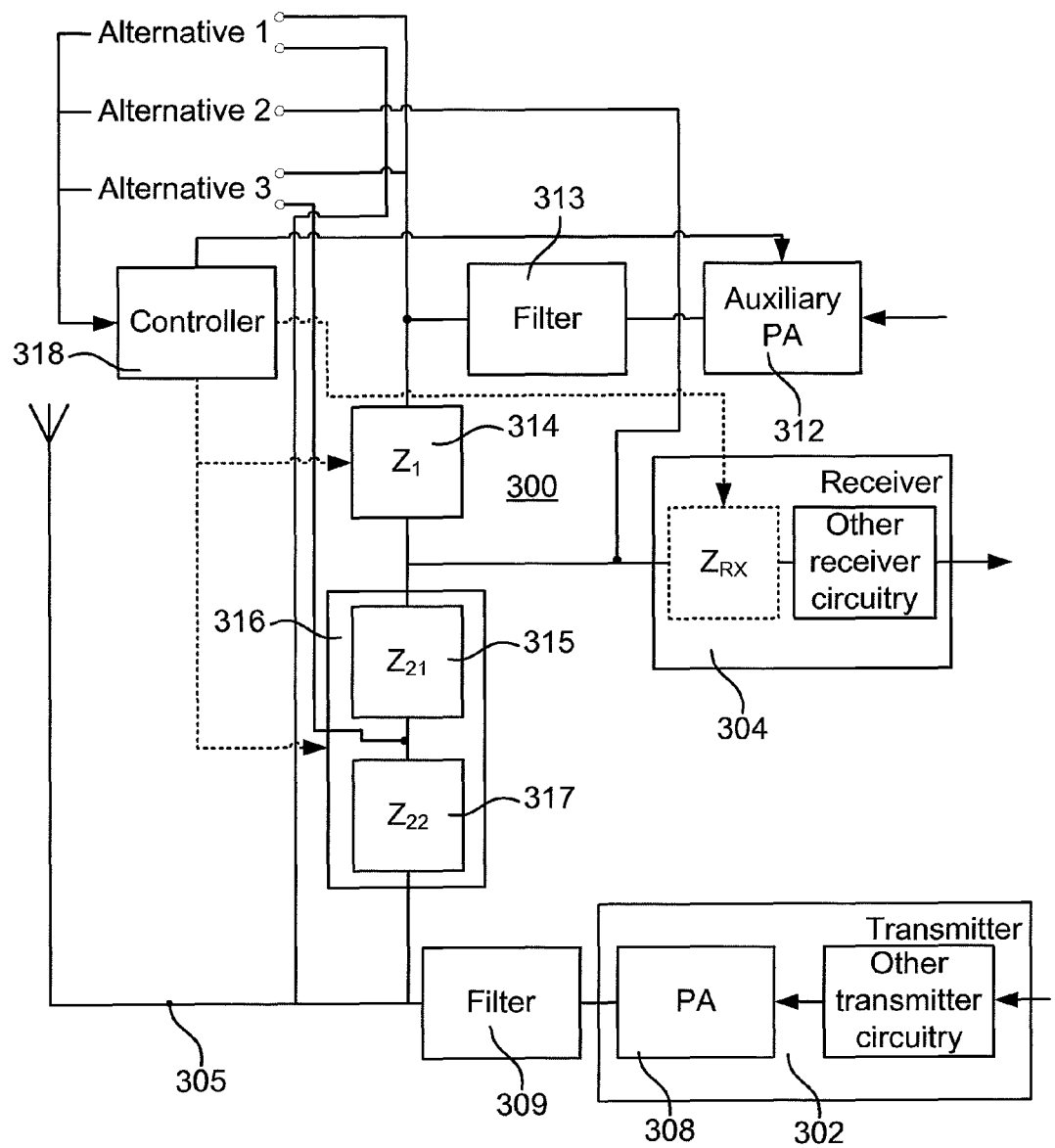
FIG. 3 is a block diagram which schematically illustrates transceiver according to an embodiment.

FIG. 3 is a block diagram which schematically illustrates a transceiver 300 according to an embodiment. In FIG. 3, a number of alternatives for measuring a signal which is significant for the transmitter contribution to the receiver input are illustrated, and will be discussed below. By measuring such significant signal or signals, a feedback structure of the controller can be provided to adaptively control parameters of the controllable elements of the structure. The structure is similar to that illustrated in FIG. 2 except that the second impedance element of FIG. 2 is here substituted by a second impedance element 316 which comprises a first and a second impedance 315, 317 connected in series. This enables a further option for the measurement of the significant signal. The principle of measuring and controlling is however also applicable to other structures, such as those which will be demonstrated with reference to FIGS. 4 to 9, respectively. The principles of measuring the contributions by the PA and the auxiliary PA, or measuring the actual contribution at the input of the receiver, or a combination thereof, for controlling the auxiliary PA, and also different controllable impedances and/or filters that are provided in the different structures demonstrated below, are however the same for all the embodiments.

Returning to FIG. 3, the measurements should be made such that the measurement does not have impact on the radio signals in the reception or transmit paths. By using high input impedance circuitry for the measurements, this can be achieved. For the measurement points indicated as "Alternative 1", the signals at the outputs of the auxiliary PA and the PA, or the outputs of the respective filters thereof, of the transmitter are monitored, and based on these signals, the controller is able to perform the control according to the principles discussed above, i.e. to control the phase of the auxiliary PA and control the voltage and/or the impedances of the impedance elements such that the voltage division provides a reduced contribution from the transmitter to the receiver input. Alternatively, the contribution from the transmitter is measured directly at the input of the receiver, as indicated as "Alternative 2". This alternative may also need information, e.g. by measuring for example at PA output of the transceiver, about the transmit signal. Further alternatively, as indicated as "Alternative 3", the measurement can be made from the voltage division of the impedances 315, 317 of the second impedance element 316, wherein for example a fixed relationship between the impedances 315, 317 are chosen as a designed relationship between the output voltages of the auxiliary PA and the PA of the transmitter, and the control mechanism is enabled to be made very simple.

The feedback mechanism of the controller is thus arranged to minimise the contribution from the transmitter at the input of the receiver. The feedback mechanism will then comprise a model for the chosen alternative of measuring, and together with a chosen model for controlling the auxiliary PA and the impedance elements, the controller will provide control signals and the contribution will be kept reduced although changes in signal environment such as antenna impedance and used frequency band occur.

Figure 4:
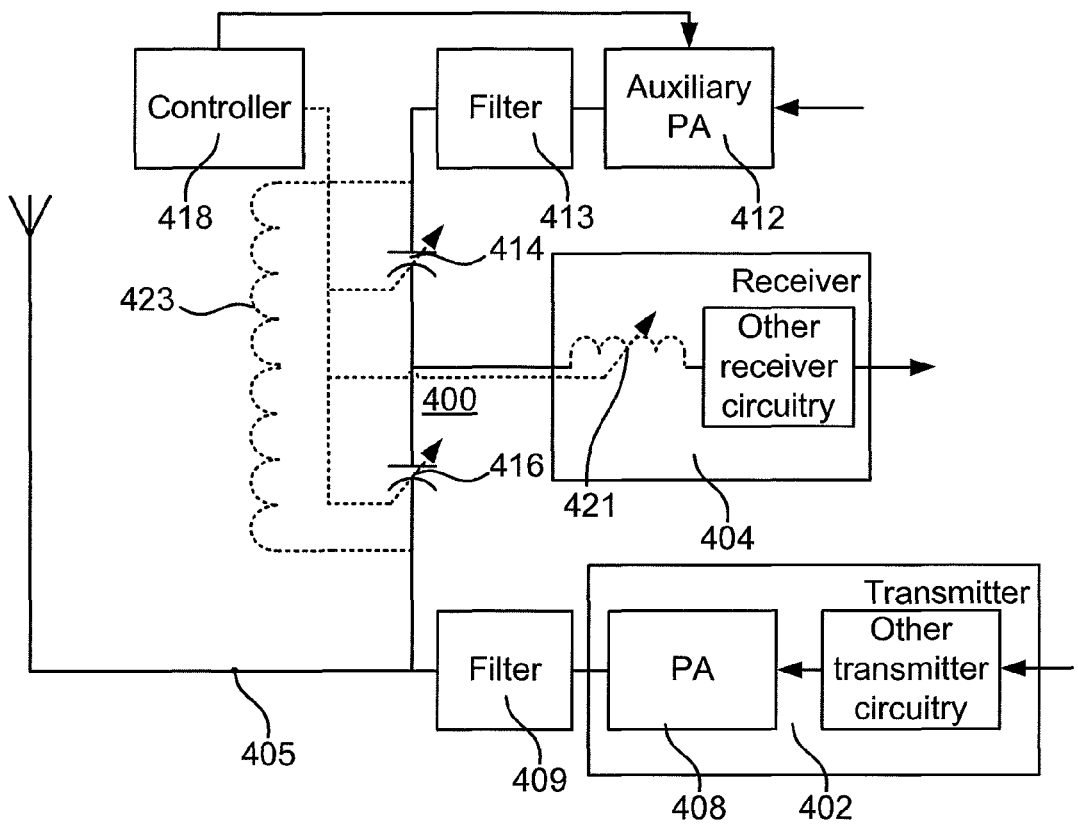
FIG. 4 is a block diagram which schematically illustrates transceiver according to an embodiment.

FIG. 4 is a block diagram which schematically illustrates a transceiver 400 according to an embodiment. The transceiver 400 has a similar structure as the one illustrated in FIG. 2, but where the first and second impedance elements is constituted by a first variable capacitor 414 and a second variable capacitor 416, and the receiver impedance element is a variable inductor 421. Here, the embodiment illustrated in FIG. 3 with the second impedance element having a first and second impedance can be understood from the embodiment of FIG. 4 to have a first and a second variable capacitor as the first and second impedances.

In FIG. 4, an optional inductor 423 is illustrated, which together with the capacitors 414, 416 form a parallel resonance tank which can be tuned to a frequency of a signal received at the antenna which is desired to be reduced. This frequency can for example be a signal from a wireless local access network node which otherwise would interfere with for example a desired signal from a cellular communication system base station. An additional effect of the optional inductor is that biasing of the PA and the auxiliary PA is facilitated.

Figure 5:
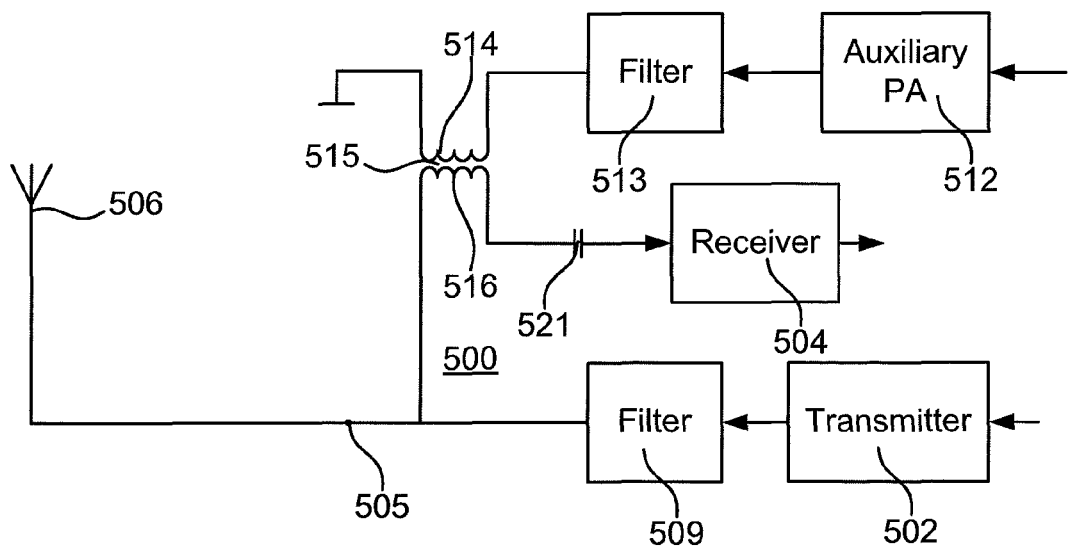
FIG. 5 is a block diagram which schematically illustrates transceiver according to an embodiment.

FIG. 5 is a block diagram which schematically illustrates a transceiver 500 according to an embodiment. In FIG. 5, depiction of some elements such as the controller and control paths have been omitted for the sake of easier understanding, since these features essentially correspond to what has been demonstrated for the embodiments above. As demonstrated for the embodiments above, the transceiver 500 comprises a transmitter 502 with an output filter 509, a receiver 504, an antenna 506, and an auxiliary PA 512 with an output filter 513. Instead, FIG. 5 intends to demonstrate an alternative way of decreasing the transmitter contribution where the alternative instead of relying on a voltage division over impedances as demonstrated above relies on counter-acting magnetic fields generated in a transformer 515 where a primary winding 516 connects the antenna 506, and thus also the transmitter 502 to the input of the receiver 504. The magnetic field caused by the primary winding 516 is thereby caused by these two components. A secondary winding 514 is connected to the auxiliary PA, which by control of amplitude and phase, as demonstrated above, is arranged to cause a magnetic field counteracting the magnetic field component caused by the transmitter. The resulting magnetic field, which thereby will be the resulting signal towards the receiver, will thus only represent the signal received by the antenna 506. Here, it should be noted that the filter 513 due to its high impedance at receiving frequency makes receiving signal drop over the transformer 515 negligible since the current swing in the secondary winding 514 will be minimal. Noted should also be that an impedance, here capacitor 521, can be connected between the primary winding 516 and the input of the receiver 504 to provide a low-impedance path at receive frequency from the antenna 506. It should here also be noted that the terms "primary" and "secondary" about the windings are used only for distinguishing between them for clearer explanation, and the opposite choice of terminology would be as correct, e.g. by considering the insertion of the counter-field by the auxiliary PA to be at the "primary" winding.

Figure 6:
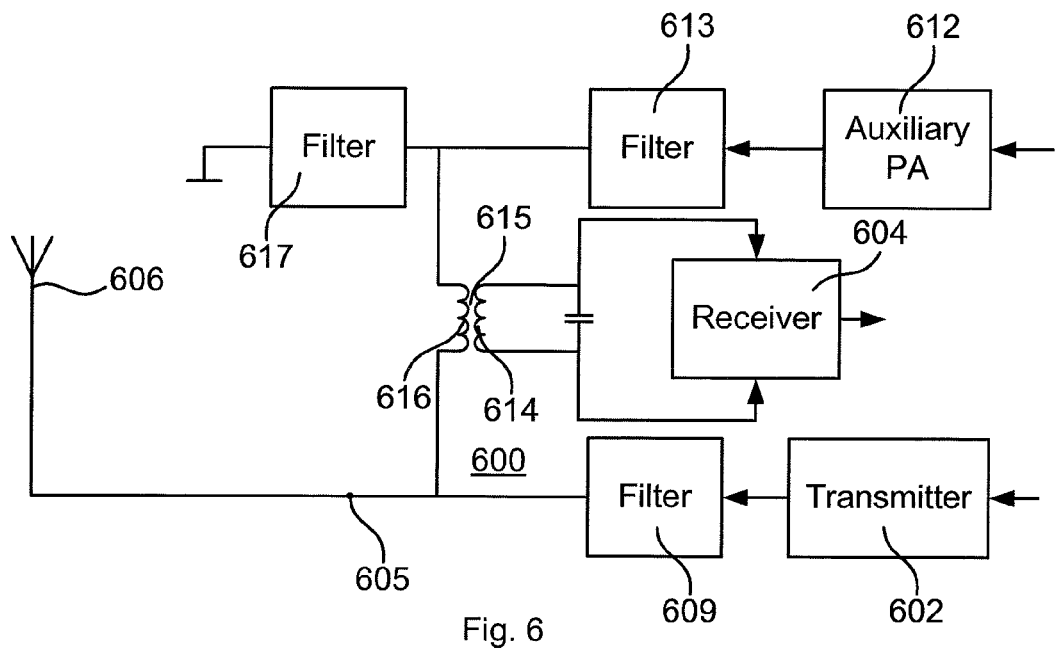
FIG. 6 is a block diagram which schematically illustrates transceiver according to an embodiment.

FIG. 6 is a block diagram which schematically illustrates a transceiver 600 according to an embodiment. In FIG. 6, depiction of some elements such as the controller and control paths have been omitted for the sake of easier understanding, since these features essentially correspond to what has been demonstrated for the embodiments above. As demonstrated for the embodiments above, the transceiver 600 comprises a transmitter 602 with an output filter 609, a receiver 604, an antenna 606, and an auxiliary PA 612 with an output filter 613. Here, a transformer 615 comprises a primary winding 616 connected between the antenna 606, and thus the output of the filter 609 of the transmitter 602, and the output of the filter 613 of the auxiliary PA 612. Already here, it can be seen that by proper control of the auxiliary PA 612, the contribution from the transmitter 602 can be counter-acted. The transformer 615 also comprises a secondary winding 614 interacting with the primary winding 616, wherein the secondary winding 614 is coupling a received signal to the receiver 604. A filter 617 connected between a reference voltage and the primary winding 616 provides for current swing at the receiving frequency in the primary winding (the output filter 613 will not as elucidated with reference to FIG. 5). Thus, the filter 617 should provide low impedance at receiving frequencies, and can also be controllable by a controller to enable handling of different frequency allocations. The received signal will thus be present across the secondary winding 614 and can be coupled to the input of the receiver 604, which here can have a differential low-noise amplifier without additional balun.

Figure 7:
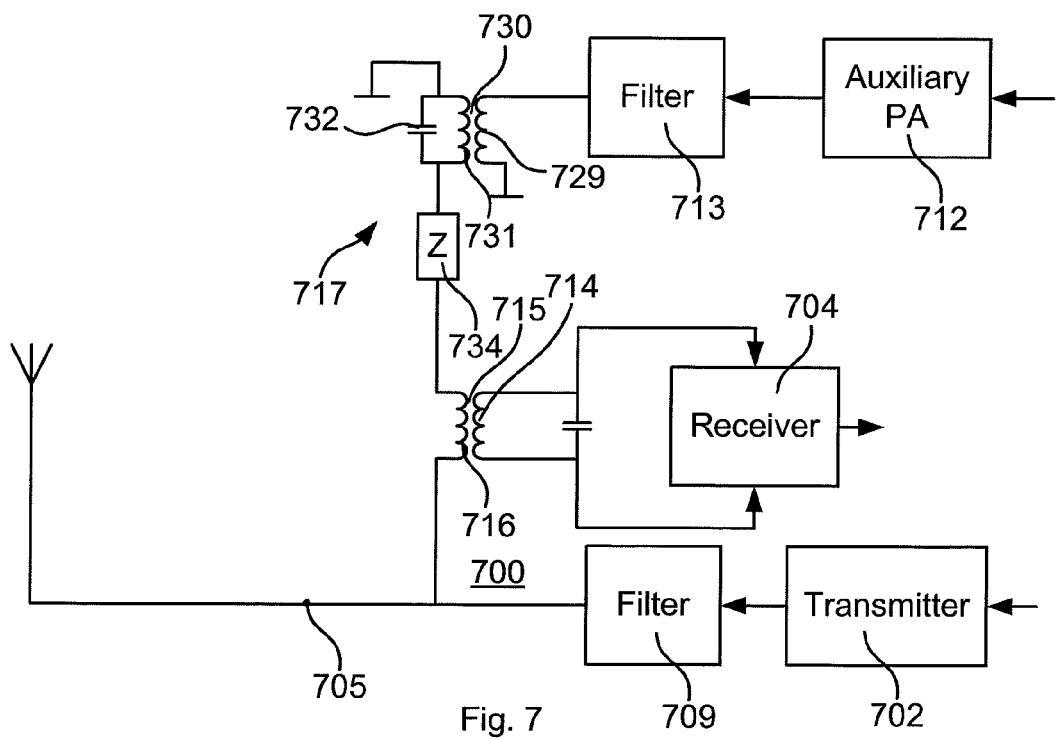
FIG. 7 is a block diagram which schematically illustrates transceiver according to an embodiment.

FIG. 7 is a block diagram which schematically illustrates a transceiver 700 according to an embodiment. The structure and principles of the embodiment shown in FIG. 7 resembles the one demonstrated with reference to FIG. 6 with the difference that the signal from the auxiliary PA and its output filter is provided through a transformer 730 which is made part of a filter 717 corresponding to the filter 617 of the embodiment of FIG. 6. The filter 717 comprises a capacitance 732 in parallel with an inductance 731 which is also a winding in the transformer 730. This parallel coupling is connected between a reference voltage and an impedance 734 which in turn is connected to a primary winding 716 of a transformer 715 which corresponds to the transformer 615 demonstrated with reference to FIG. 6. Depending on the impedance 734, the filter 717 will be a high-pass or a low-pass filter, which should be chosen to have low impedance at receive frequencies and the selection of high-pass or low-pass depends on frequency allocation for receive and transmit frequencies, i.e. the impedance of the filter 717 should be high for transmit frequencies. The contribution from the auxiliary PA is inserted by a secondary winding 729 (also here, the terms "primary" and "secondary" are just for distinguishing between the windings) which is connected between the output of the filter of the auxiliary PA and a reference voltage. In other senses, the features of this embodiment are the same as for the one demonstrated with reference to FIG. 6.

Figure 8:
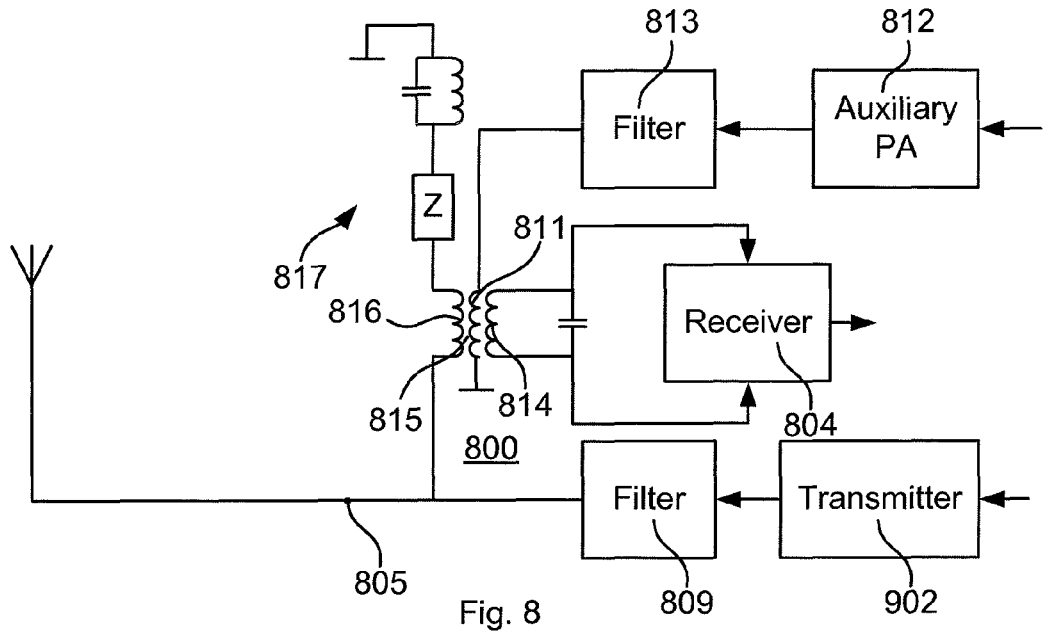
FIG. 8 is a block diagram which schematically illustrates transceiver according to an embodiment.

FIG. 8 is a block diagram which schematically illustrates a transceiver 800 according to an embodiment. The structure and principles of the embodiment shown in FIG. 8 resembles the one demonstrated with reference to FIGS. 6 and 7 with the difference that the signal from the auxiliary PA and its output filter is provided through a third winding 811 of a transformer 815, which otherwise corresponds to the transformers 615 and 715 of FIGS. 6 and 7.

Figure 9:
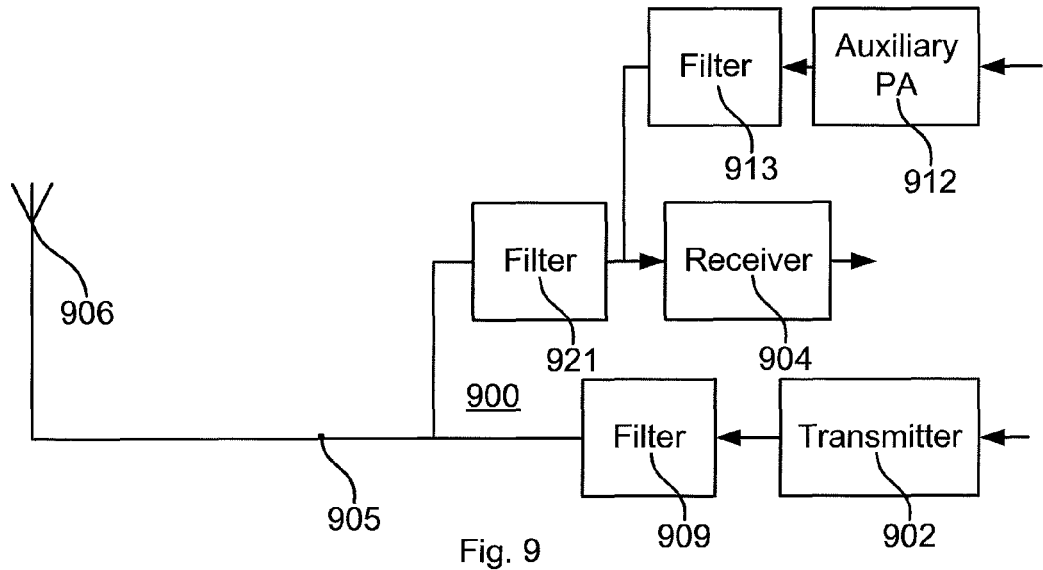
FIG. 9 is a block diagram which schematically illustrates transceiver according to an embodiment.

FIG. 9 is a block diagram which schematically illustrates a transceiver 900 according to an embodiment. In FIG. 9, depiction of some elements such as the controller and control paths have been omitted for the sake of easier understanding, since these features essentially correspond to what has been demonstrated for the embodiments above. As demonstrated for the embodiments above, the transceiver 900 comprises a transmitter 902 with an output filter 909, a receiver 904, an antenna 906, and an auxiliary PA 912 with an output filter 913. The transmitter 902 is connected via its output filter 909 to the antenna 906. The antenna 906 is also connected to the input of the receiver 904 via a receiver filter 921. Here, the transmitter filter 909 has low insertion loss at transmit frequencies and high insertions loss at receive frequencies, while the receiver filter 921 has low insertion loss at receive frequencies and high insertion loss at transmit frequencies. However, attenuation by the filters 909, 921 is of course finite, wherein the auxiliary PA 912 through its output filter 913 provides a countersignal directly at the input of the receiver 904. The applied countersignal is controlled by adapting phase and amplitude, as for the other embodiments. In this embodiment, the approach of measuring contribution at receiver input and providing feedback control to the auxiliary PA provides for a fast and uncomplicated control mechanism.

Figure 10:
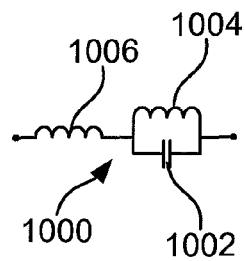
FIG. 10 illustrates a filter according to an embodiment.

The filters in the different embodiments demonstrated above can be made more or less complex, and with different constraints on impedance matching. Simple filters comprising single capacitors or inductors may be used, but may not fulfil the demands of constraints set up. High-order filters may on the other hand introduce other problems, and/or cost/space issues. FIG. 10 illustrates a filter 1000 according to an embodiment, which provides dual resonance properties where high insertion loss is provided at one frequency and low insertion loss is provided at another frequency not far from the first frequency, and has been found a reasonable compromise for at least some of the embodiments. It comprises an inductance 1004 coupled in parallel with a capacitance 1002, wherein the parallel coupling 1002, 1004 is coupled in series with an inductance 1006 between the input and output of the filter 1000. It provides a parallel resonance, attenuating the signal at a frequency below a series resonance where the signal is passed.

Figure 11:
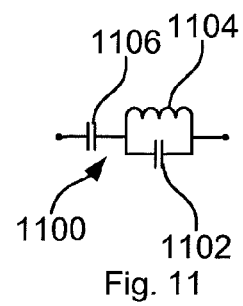
FIG. 11 illustrates a filter according to an embodiment.

FIG. 11 illustrates a filter 1100 according to an embodiment, which corresponds to the filter demonstrated with reference to FIG. 10, but with the difference that the parallel coupling 1102, 1104 is coupled in series with a capacitance 1106 between the input and output of the filter 1100, and that it provides a series resonance frequency below the parallel resonance frequency.

Figure 12:
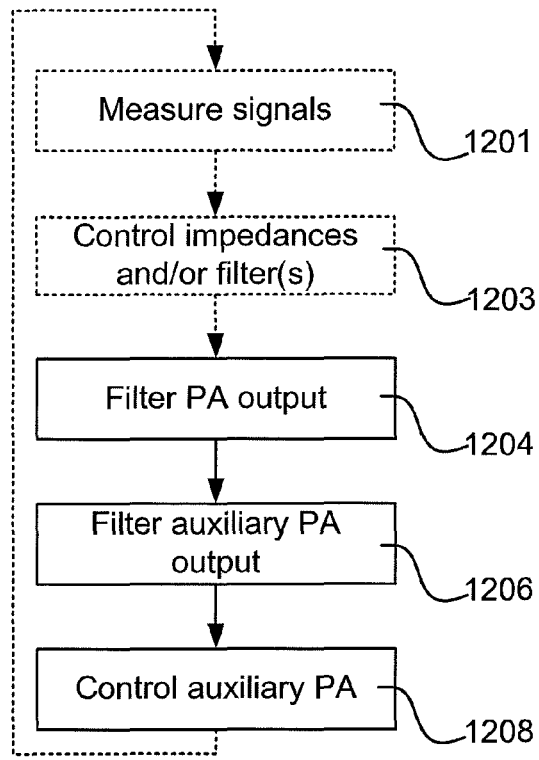
FIG. 12 is a flow chart which schematically illustrates a method according to embodiments.

FIG. 12 is a flow chart which schematically illustrates a method according to embodiments. The method is for controlling a transceiver as one of those demonstrated above. The method comprises filtering 1204 the output of the PA to attenuate frequencies at receiving frequencies, and filtering 1206 the output of the auxiliary PA to attenuate frequencies at receiving frequencies. The method comprises controlling 1208 the auxiliary PA to provide a signal that has a phase and amplitude in relation to the output of the power amplifier of the transmitter such that the transmitter contribution to the signal at the input of the receiver is suppressed. As indicated by the dotted arrow, the method is an ongoing process at operation of the transceiver.

The method can optionally include controlling 1203 impedances and/or filters of the transceiver. For example, when a signal transmission arrangement of the transceiver comprises a first impedance element connected between an output of the auxiliary power amplifier and an input of the receiver, and a second impedance element connected between an output of the power amplifier of the transmitter and the input of the receiver, wherein the first impedance element has controllable impedance and the second impedance element has controllable impedance, as for example demonstrated with reference to FIG. 2, 3 or 4, the method can comprise controlling the impedances of the first and second impedance elements.

Depending on the structure of the transceiver, the controlling of the auxiliary power amplifier can be made to, at its output, have a relation in phase to the output of the power amplifier of the transmitter and to have an amplitude, at its output, having a relation to the output of the power amplifier of the transmitter, and the first and second impedance elements to have a corresponding relation of their impedances. Further, the controlling can comprise controlling the auxiliary power amplifier to have, at its output, opposite phase to the output of the power amplifier of the transmitter and to have, at its output, equal amplitude to the output of the power amplifier of the transmitter, and the first and second impedance elements have equal impedances.

For a structure as for example the one depicted in FIG. 5, the method can further comprise controlling a controllable capacitance 521.

For a structure as for example the one depicted in FIG. 6 the method can further comprise controlling the filter 617.

For a structure as for example the one depicted in FIG. 7, the method can further comprise controlling the filter 717, e.g. by controlling the impedance 734 and/or the capacitance 732. For a structure as for example the one depicted in FIG. 8, the similar applies.

For a structure as for example the one depicted in FIG. 9, the method can further comprise controlling the filter 921.

The controlling can be feedback controlling by measuring 1201 signals and providing control based thereon. The controlling can for example be feedback controlling by measuring 1201 the output of the power amplifier of the transmitter and the output of the auxiliary power amplifier wherein the feedback controlling is based on the measurements. The controlling can feedback controlling by measuring 1201 the transmitter contribution at the input of the receiver wherein the feedback controlling is based on the measurement. The controlling can also be a combination of these.

For a structure including a controllable receiver impedance element at the input of the receiver, the method can further comprise controlling the impedance of the receiver impedance element such that a path towards the receiver of the signal transmission arrangement and the receiver impedance element together have a resonance frequency equal to a frequency of a signal desired to be received by the receiver. Thereby, low loss from the antenna to the receiver can be kept.

Figure 13:
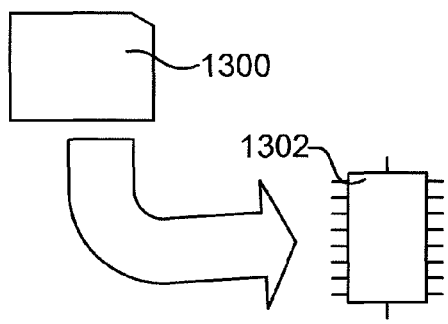
FIG. 13 schematically illustrates a computer program and a processor.

The methods according to the present invention are suitable for implementation with aid of processing means, such as computers and/or processors, especially for the case where the controlling of the transceiver according to the embodiment described above is performed by such processing means. Therefore, there is provided computer programs, comprising instructions arranged to cause the processing means, processor, or computer to perform the steps of any of the methods according to any of the embodiments described with reference to FIG. 12. The computer programs preferably comprises program code which is stored on a computer readable medium 1300, as illustrated in FIG. 13, which can be loaded and executed by a processing means, processor, or computer 1302 to cause it to perform the methods, respectively, according to embodiments of the present invention, preferably as any of the embodiments described with reference to FIG. 12. The computer 1302 and computer program product 1300 can be arranged to execute the program code sequentially where actions of the any of the methods are performed stepwise. The processing means, processor, or computer 1302 is preferably what normally is referred to as an embedded system. Thus, the depicted computer readable medium 1300 and computer 1302 in FIG. 13 should be construed to be for illustrative purposes only to provide understanding of the principle, and not to be construed as any direct illustration of the elements.

Figure 14:
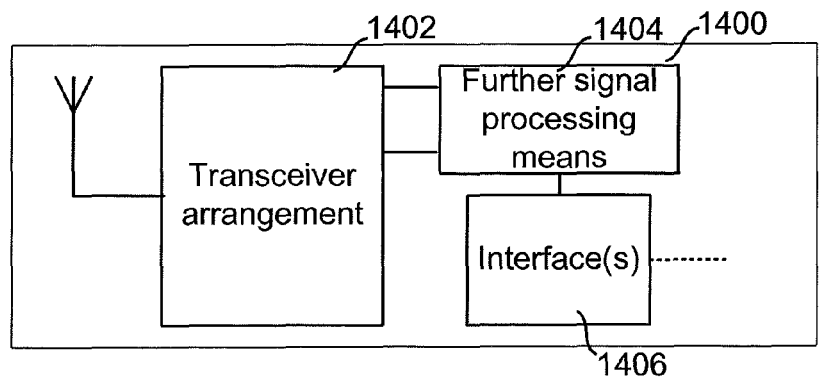
FIG. 14 is a block diagram schematically illustrating a communication device according to an embodiment.

FIG. 14 is a block diagram schematically illustrating a communication device 1400 according to an embodiment. The communication device 1400, which can be a mobile terminal, a communication card e.g. in a laptop, controller of a machine or other processing device, or a network node, comprises a transceiver arrangement 1402 as any of those demonstrated above, further signal processing means 1404, and one or more interfaces 1406, e.g. electrical, optical, or user interfaces. The transceiver arrangement 1402 handles wireless communication with e.g. cellular communication network nodes, cellular terminals, point-to-point communication nodes, etc., and optionally also other entities. Inputs and outputs from and to the wireless operations are provided to and from the further signal processing means 1404. The further signal processing means 1404 is enabled to interact through the one or more interfaces 1406.

FIG. 15 is a block diagram schematically illustrating a transceiver 1500 applying an approach for controlling auxiliary power amplifier output by applying adjustments in the auxiliary power amplifier 1512. The same signal as provided to the power amplifier 1508 of the main power amplifier is then provided to the auxiliary power amplifier path.

FIG. 16 is a block diagram schematically illustrating a transceiver 1600 applying an approach for controlling auxiliary power amplifier output by applying adjustments in a circuit 1611 for adjusting phase and amplitude input to the auxiliary power amplifier 1612. The same signal as provided to the power amplifier 1608 of the main power amplifier is then provided to the circuit 1611 for adjusting phase and amplitude wherein the adjusted signal then is provided further in the auxiliary power amplifier path.

FIG. 17 is a block diagram schematically illustrating a transceiver 1700 applying an approach for controlling auxiliary power amplifier output by applying adjustments in a baseband circuit 1701 connected to the transceiver as demonstrated with reference to any of FIGS. 2 to 9. Different signals can then be provided to the power amplifier 1708 of the main power and the auxiliary power amplifier 1712 path. The adjustment in the baseband circuit 1701 can be done either in digital domain or in analog domain.

In all of the approaches demonstrated with reference to FIGS. 15 to 17, the controller provides the control of the output of the auxiliary power amplifier. Any of the approaches demonstrated with reference to FIGS. 15 to 17 can be applied to any of the structures demonstrated with reference to FIGS. 2 to 9.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A transceiver suitable for frequency duplex division communication, the transceiver comprising:
   a transmitter, the transmitter comprising a power amplifier;
   a receiver;
   an auxiliary power amplifier configured to provide a controllable phase shift and gain output;
   a first filter arranged at an output of the power amplifier and configured to attenuate frequencies at a receiving frequency of the receiver;
   a second filter at an output of the auxiliary power amplifier and configured to attenuate frequencies at a receiving frequency of the receiver;
   a signal transmission arrangement configured to:
      transmit signals provided from the transmitter through its power amplifier to a radio frequency (RF) connecting point via the first filter;
      receive signals from the RF connecting point and provide the signals to the receiver; and
      provide signals from the auxiliary amplifier towards an input of the receiver; and
   a controller configured to control the auxiliary power amplifier output to provide a signal that has a phase and amplitude in relation to the output of the power amplifier of the transmitter such that the transmitter contribution to the signal at the input of the receiver is suppressed.

2. The transceiver of claim 1, wherein:
   the receiving frequency of the receiver is lower than a transmitting frequency of the transmitter;
   the first filter is a high-pass filter or a band-pass filter; and
   the second filter is a high-pass filter or a band-pass filter.

3. The transceiver of claim 2, wherein the band-pass filters of the first and second filters each comprises a capacitance and a first inductance coupled in parallel where the parallel coupling is coupled in series with a second inductance.

4. The transceiver of claim 3, wherein at least one of the capacitance and the first and second inductances of each of the first and second filters are controllable and are controlled by the controller.

5. The transceiver of claim 1, wherein:
the receiving frequency of the receiver is higher than a transmitting frequency of the transmitter,
the first filter is a low-pass filter or a band-pass filter; and
the second filter is a low-pass filter or a band-pass filter.

6. The transceiver of claim 5, wherein the band-pass filters of the first and second filters each comprises a first capacitance and an inductance coupled in parallel, where the parallel coupling is coupled in series with a second capacitance.

7. The transceiver of claim 6, wherein at least one of the inductance and the first and second capacitances of each of the first and second filters are controllable and are controlled by the controller.

8. The transceiver of claim 1, wherein the controller is configured to control an input to the auxiliary power amplifier such that the auxiliary power amplifier is enabled to provide the controllable phase shift and gain output.

9. The transceiver of claim 8, wherein the control of the input to the auxiliary power amplifier is a control of a baseband circuit connected to the transceiver.

10. The transceiver of claim 1, wherein the controller is configured to control the auxiliary power amplifier such that the auxiliary power amplifier is enabled to provide the controllable phase shift and gain output.

11. The transceiver of claim 1, wherein the signal transmission arrangement comprises:
a first impedance element connected between an output of the second filter and an input of the receiver; and
a second impedance element connected between an output of the first filter and the input of the receiver wherein the second impedance element also is connected between the RF connecting point and the input of the receiver.

12. The transceiver of claim 11, wherein:
the first impedance element has controllable impedance;
the second impedance element has controllable impedance; and
the controller is configured to control also impedances of the first impedance element and the second impedance element.

13. The transceiver of claim 12, wherein:
the output of the auxiliary power amplifier is controlled to have a relation in phase to the output of the power amplifier of the transmitter and to have an amplitude having a relation to the output of the power amplifier of the transmitter; and
the first and second impedance elements are controlled to have a corresponding relation of their impedances.

14. The transceiver of claim 13, wherein:
the output of the auxiliary power amplifier is controlled to have opposite phase to the output of the power amplifier of the transmitter and to have equal amplitude to the output of the power amplifier of the transmitter; and
the first and second impedance elements have equal impedances.

15. The transceiver of claim 11, wherein:
the second impedance element comprises a first and a second impedance connected in series;
the controller is configured to provide its control by a feedback structure and measure at a point between the first and second impedances of the second impedance element and the output of the auxiliary power amplifier; and
wherein feedback is based on the measurements.

16. The transceiver of claim 11:
further comprising a parallel resonance tank circuit including the first and second impedance elements and a third impedance element connected between the output of the second filter of the auxiliary power amplifier and first filter of the power amplifier of the transmitter; and
wherein the parallel resonance tank is tuned to a frequency of a signal component received by the signal transmission arrangement that is desired to be suppressed.

17. The transceiver of claim 11, wherein:
the receiver further comprises a receiver impedance element at the input of the receiver, the receiver impedance element having controllable impedance; and
the controller is configured to control the receiver impedance element such that the second impedance element and the receiver impedance element together have a resonance frequency equal to a frequency of a signal desired to be received by the receiver.

18. The transceiver of claim 11, wherein the first and second impedance elements comprise inductors.

19. The transceiver of claim 11, wherein the first and second impedance elements comprise capacitors.

20. The transceiver of claim 1, wherein the signal transmission arrangement comprises:
a connection coupling the output signal from the first filter to the RF connecting point;
a primary winding coupling a signal from the RF connecting point to the receiver via a capacitance; and
a secondary winding interacting with the primary winding and coupled to the output of the second filter of the auxiliary power amplifier such that the provision of the signals from the auxiliary power amplifier is enabled.

21. The transceiver of claim 1, wherein:
the signal transmission arrangement comprises a primary winding connected to the RF connecting point and a secondary winding interacting with the primary winding;
the secondary winding is coupling a signal from the RF connecting point to the receiver; and
wherein the primary winding is coupled:
to the output of the second filter of the auxiliary power amplifier such that the provision of the signals from the auxiliary power amplifier is enabled; and
to a third filter connected to a reference voltage such that current swing at the receiving frequency is enabled in the primary winding.

22. The transceiver of claim 1:
wherein the signal transmission arrangement comprises a primary winding connected to the RF connecting point, and a secondary winding interacting with the primary winding,
wherein the secondary winding is coupling a signal from the RF connecting point to the receiver;
wherein the primary winding is coupled to a third filter connected to a reference voltage such that current swing at the receiving frequency is enabled across the primary winding;
wherein the third filter comprises a further primary winding; and
wherein a further secondary winding interacting with the further primary winding is coupled to the output of the second filter of the auxiliary power amplifier such that the provision of the signals from the auxiliary power amplifier is enabled.

23. The transceiver of claim 1:
wherein the signal transmission arrangement comprises a first primary winding connected to the RF connecting point, a second primary winding, and secondary winding interacting with the first and secondary primary windings;
wherein the secondary winding is coupling a signal from the RF connecting point to the receiver;
wherein the first primary winding is coupled to a third filter connected to a reference voltage such that current swing at the receiving frequency is enabled in the first primary winding; and
wherein the second primary winding is coupled to the output of the second filter of the auxiliary power amplifier such that the provision of the signals from the auxiliary power amplifier is enabled.

24. The transceiver of claim 1:
wherein the signal transmission arrangement comprises:
a connection coupling the output signal from the first filter to the RF connecting point; and
a third filter coupling a signal from the RF connecting point to the receiver; and
wherein the output of the second filter is connected directly to the input of the receiver.

25. The transceiver of claim 24, wherein:
the receiving frequency of the receiver is lower than a transmitting frequency of the transmitter; and
the third filter is a low-pass filter or a band-pass filter.

26. The transceiver of claim 25, wherein the band-pass filter of third filter comprises a first capacitance and an inductance coupled in parallel, where the parallel coupling is coupled in series with a second capacitance.

27. The transceiver of claim 26, wherein at least one of the inductance and the first and second capacitances of the third filter is controllable and is controlled by the controller.

28. The transceiver of claim 24, wherein:
the receiving frequency of the receiver is higher than a transmitting frequency of the transmitter; and
the third filter is a high-pass filter or a band-pass filter.

29. The transceiver of claim 28, wherein the band-pass filter of third filter comprises a capacitance and a first inductance coupled in parallel, with the parallel coupling coupled in series with a second inductance.

30. The transceiver of claim 29, wherein at least one of the capacitance and the first and second inductances of the third filter is controllable and is controlled by the controller.

31. The transceiver of claim 1, wherein:
the controller is configured to provide its control by a feedback structure and measure the output of the power amplifier of the transmitter and the output of the auxiliary power amplifier; and
feedback is based on the measurements.

32. The transceiver of claim 1, wherein:
the controller is configured to provide its control by a feedback structure and measure the transmitter contribution at the input of the receiver; and
feedback is based on the measurement.

33. A communication device, capable of frequency division duplex communication in a communication network, the communication device comprising:
a transceiver; and
wherein the transceiver comprises:
a transmitter, the transmitter comprising a power amplifier;
a receiver;
an auxiliary power amplifier configured to provide a controllable phase shift and gain output;
a first filter arranged at an output of the power amplifier and configured to attenuate frequencies at a receiving frequency of the receiver;
a second filter at an output of the auxiliary power amplifier and configured to attenuate frequencies at a receiving frequency of the receiver;
a signal transmission arrangement configured to:
transmit signals provided from the transmitter through its power amplifier to a radio frequency (RF) connecting point via the second filter;
receive signals from the RF connecting point and provide the signals to the receiver; and
provide signals from the auxiliary amplifier towards an input of the receiver; and
a controller configured to control the auxiliary power amplifier output to provide a signal that has a phase and amplitude in relation to the output of the power amplifier of the transmitter such that the transmitter contribution to the signal at the input of the receiver is suppressed.

* * * * *

UNITED STATES PATENT AND TRADEMARK OFFICE
CERTIFICATE OF CORRECTION

PATENT NO. : 9,923,593 B2  
APPLICATION NO. : 14/774296  
DATED : March 20, 2018  
INVENTOR(S) : Andersson et al.

Page 1 of 1

It is certified that error appears in the above-identified patent and that said Letters Patent is hereby corrected as shown below:

In the Drawings

In Fig. 8, Sheet 5 of 8, delete Tag "902" and insert Tag -- 802 --, therefor.

In the Specification

In Column 1, Line 45, delete "transmitter 102," and insert -- transmitter 108, --, therefor.

In Column 9, Line 63, delete "controller 212" and insert -- controller 218 --, therefor.

Signed and Sealed this
Seventeenth Day of July, 2018

Andrei Iancu
*Director of the United States Patent and Trademark Office*